United States Patent
Kumar et al.

(10) Patent No.: US 12,155,495 B2
(45) Date of Patent: Nov. 26, 2024

(54) MEETING INVITE SEGMENTATION

(71) Applicant: Dell Products L.P., Round Rock, TX (US)

(72) Inventors: Dhilip Kumar, Bangalore (IN); Ajay Maikhuri, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/814,346

(22) Filed: Jul. 22, 2022

(65) Prior Publication Data
US 2024/0031183 A1   Jan. 25, 2024

(51) Int. Cl.
  *H04L 12/18*   (2006.01)
(52) U.S. Cl.
  CPC ...... *H04L 12/1818* (2013.01); *H04L 12/1822* (2013.01)
(58) Field of Classification Search
  CPC .............. H04L 12/1818; H04L 12/1822
  See application file for complete search history.

(56) References Cited

U.S. PATENT DOCUMENTS

| | | | |
|---|---|---|---|
| 10,019,695 B2* | 7/2018 | Wong | H04L 12/1818 |
| 11,501,262 B1* | 11/2022 | Shetty | G06F 40/30 |
| 2008/0294482 A1* | 11/2008 | Bank | G06Q 10/06311 |
| | | | 707/999.107 |
| 2015/0332219 A1* | 11/2015 | Putterman | G06Q 10/1095 |
| | | | 705/7.19 |

* cited by examiner

*Primary Examiner* — Nazia Naoreen
(74) *Attorney, Agent, or Firm* — Daly, Crowley, Mofford & Durkee, LLP

(57) ABSTRACT

A method comprising: receiving, at a computing device, a first input specifying a first time window for a meeting and a first set of recipients who are invited to attend the meeting, the first set being a non-empty set; receiving, at the computing device, a second input specifying a plurality of segments within the meeting, for each of the plurality of segments, the second input specifying a respective second time window for the segment, and a respective second set of recipients who are invited to attend the segment, each second set of recipients being a subset of the first set, and each second time window being a time window that falls entirely within the first time window; and generating one or more invites based on the first and second input and transmitting the one or more invites to the recipients in the first set.

17 Claims, 10 Drawing Sheets

300

| | |
|---|---|
| TITLE OF MEETING: | TEAM_MEETING_JUNE |
| TIME WINDOW: | FROM 7:00 AM TO 9:00 AM |
| REQUIRED PARTICIPANTS: | USER_A, USER_B, USER_C |
| OPTIONAL PARTICIPANTS: | NONE |

⌐302

⌐304

SEGMENT DEFINITIONS

SEGMENT 1
| | |
|---|---|
| TITLE OF SEGMENT: | GOVERNANCE |
| TIME WINDOW: | FROM 7:00 AM TO 7:30 AM |
| REQUIRED PARTICIPANTS: | USER_A, USER_B |

⌐312A

SEGMENT 2
| | |
|---|---|
| TITLE OF SEGMENT: | METAVERSE |
| TIME WINDOW: | FROM 8:00 AM TO 8:30 AM |
| REQUIRED PARTICIPANTS: | USER_A, USER_C |

⌐312B

SEGMENT 3
| | |
|---|---|
| TITLE OF SEGMENT: | MOONSHOT GOAL |
| TIME WINDOW: | FROM 8:30 AM TO 9:00 AM |
| REQUIRED PARTICIPANTS: | USER_B, USER_C |

```
                                                            ┌─ 332A
┌─────────────────────────────────────────────────────┐
│ TITLE OF MEETING:        TEAM_MEETING_JUNE  ←── 322 │
│ TITLE OF SEGMENT:        GOVERNANCE         ←── 324 │
│ TIME WINDOW:             FROM 7:00 AM TO 7:30 AM ←── 326 │
│ REQUIRED PARTICIPANTS:   USER_A, USER_B     ←── 328 │
└─────────────────────────────────────────────────────┘

┌─ 332B
┌─────────────────────────────────────────────────────┐
│ TITLE OF MEETING:        TEAM_MEETING_JUNE  ←── 322 │
│ TITLE OF SEGMENT:        METAVERSE          ←── 324 │
│ TIME WINDOW:             FROM 8:00 AM TO 8:30 AM ←── 326 │
│ REQUIRED PARTICIPANTS:   USER_A, USER_C     ←── 328 │
└─────────────────────────────────────────────────────┘

┌─ 332C
┌─────────────────────────────────────────────────────┐
│ TITLE OF MEETING:        TEAM_MEETING_JUNE  ←── 322 │
│ TITLE OF SEGMENT:        MOONSHOT GOAL      ←── 324 │
│ TIME WINDOW:             FROM 8:30 AM TO 9:00 AM ←── 326 │
│ REQUIRED PARTICIPANTS:   USER_B, USER_C     ←── 328 │
└─────────────────────────────────────────────────────┘
```

FIG. 3B ically within the first time window; and generating one or more invites based on the first and second input and transmitting the one or more invites to the recipients in the first set.

MEETING INVITE SEGMENTATION

BACKGROUND

Scheduling applications are used to schedule and manage virtual meetings. Scheduling applications are often integrated into email clients and virtual meeting software, such as Teams™ and Zoom™. In operation, a scheduling application may generate an invite for a meeting based on user input specifying the day and time for the meeting. The invite may then be sent to different persons who are invited to attend the meeting.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided comprising: receiving, at a computing device, a first input specifying a first time window for a meeting and a first set of recipients who are invited to attend the meeting, the first set being a non-empty set; receiving, at the computing device, a second input specifying a plurality of segments within the meeting, for each of the plurality of segments, the second input specifying a respective second time window for the segment, and a respective second set of recipients who are invited to attend the segment, each second set of recipients being a subset of the first set, at least one of the second sets of recipients being a proper subset of the first set, and each second time window being a time window that falls entirely within the first time window; and generating one or more invites based on the first and second input and transmitting the one or more invites to the recipients in the first set.

According to aspects of the disclosure, a system is provided, comprising: a memory; and at least one hardware processor that is configured to perform the operations of: receiving a first input specifying a first time window for a meeting and a first set of recipients who are invited to attend the meeting, the first set being a non-empty set; receiving a second input specifying a plurality of segments within the meeting, for each of the plurality of segments, the second input specifying a respective second time window for the segment, and a respective second set of recipients who are invited to attend the segment, each second set of recipients being a subset of the first set, at least one of the second sets of recipients being a proper subset of the first set, and each second time window being a time window that falls entirely within the first time window; and generating one or more invites based on the first and second input and transmitting the one or more invites to the recipients in the first set.

According to aspects of the disclosure, a non-transitory computer-readable medium is provided that stores one or more processor-executable instructions, which, when executed by at least one processor, cause the at least one processor to perform the operations of: receiving a first input specifying a first time window for a meeting and a first set of recipients who are invited to attend the meeting, the first set being a non-empty set; receiving a second input specifying a plurality of segments within the meeting, for each of the plurality of segments, the second input specifying a respective second time window for the segment, and a respective second set of recipients who are invited to attend the segment, each second set of recipients being a subset of the first set, at least one of the second sets of recipients being a proper subset of the first set, and each second time window being a time window that falls entirely within the first time window; and generating one or more invites based on the first and second input and transmitting the one or more invites to the recipients in the first set.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 3A is a diagram of an example of a primary invite for a meeting, according to aspects of the disclosure;

FIG. 3B is a diagram of a plurality of secondary invites that are generated based on the primary invite of FIG. 3A, according to aspects of the disclosure;

DETAILED DESCRIPTION

Figure 1:
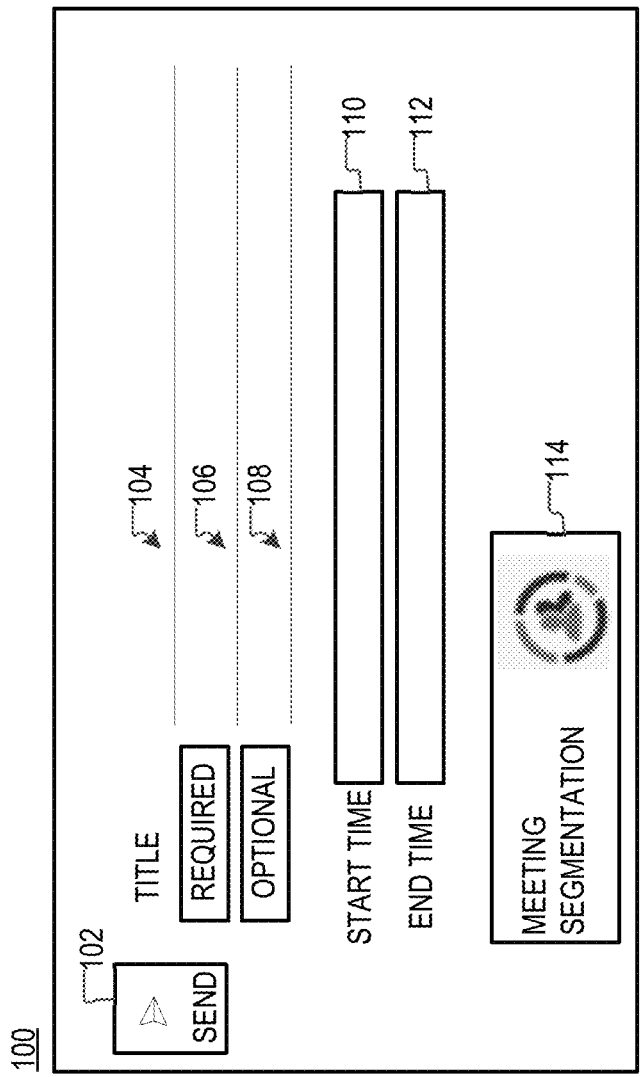
FIG. 1 is a diagram of an example of a user interface screen, according to aspects of the disclosure.
Figure 2:
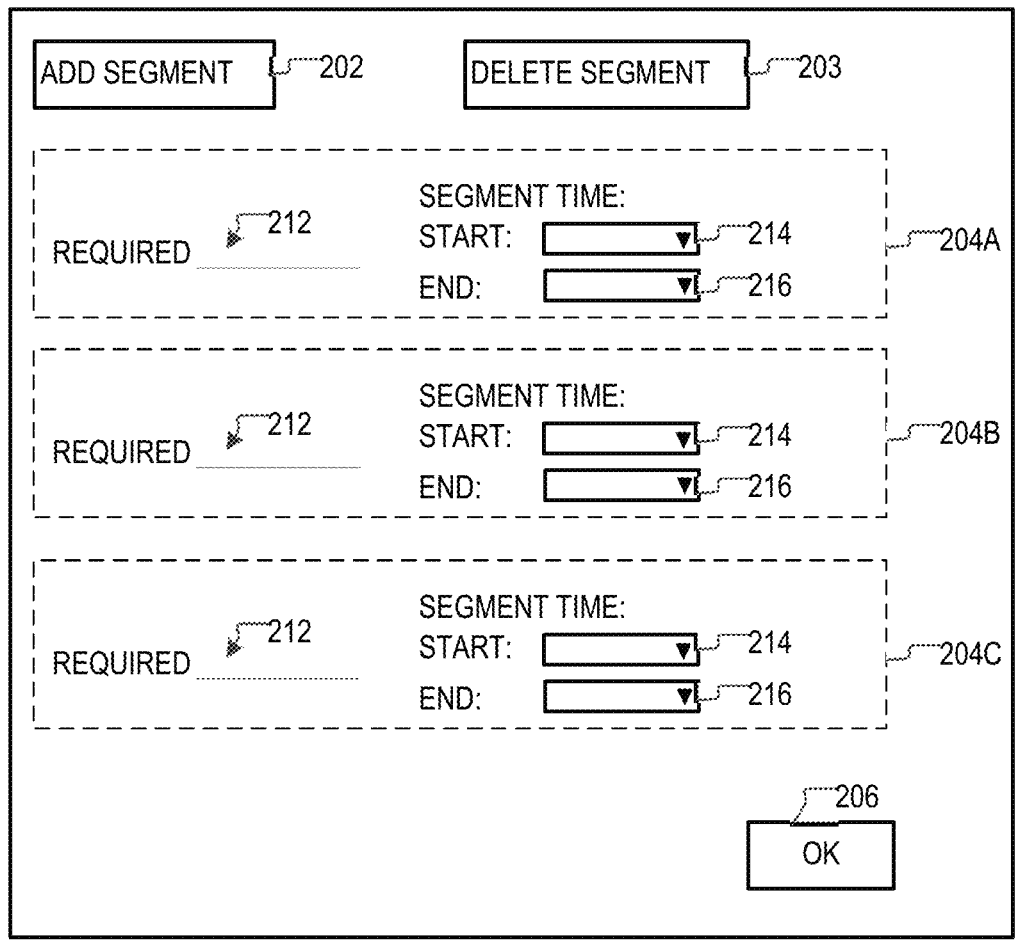
FIG. 2 is a diagram of an example of a user interface screen, according to aspects of the disclosure.

FIG. 1 is a diagram of an example of a screen 100, according to aspects of the disclosure. The screen 100 may be part of the interface 502 of an invite processor 403 (shown in FIGS. 4-5). The invite processor 403 may be software that is configured to generate a meeting invite in response to input that is received via the interface 502 (e.g., input received via the screen 100 and optionally a screen 200, which is shown in FIG. 2). The meeting invite may include an invite to a teleconference, an invite to an in-person meeting, an invite to a telephone call, an invite to a video call, an invite to a text chat session, and/or an invite to any other suitable type of meeting.

The screen 100 may include a send input component 102, a title input component 104, a required participants input component 106, and an optional participants input component 108. In addition, the screen 100 may include a start time input component 110, an end time input component 112, and a meeting segmentation input component 114. Each of the input components 104, 106, and 108 may include a text input field. The input component 104 may be configured to receive input specifying the title of a meeting. The "title" of the meeting may include a subject line for the meeting and/or any other suitable type of identifier. The input component 106 may be configured to receive input specifying the emails (or other identifiers) of one or more participants who are required to attend the meeting. The input component 108 may be configured to receive input specifying the emails (or other identifiers) of one or more participants who are not required to attend the meeting but are nevertheless invited. Input components 110-112 may be configured to receive input specifying the beginning and end of a time window during which the meeting is desired to be conducted. The send input component 102 may include a button. In response to the button being pressed, the device displaying the screen 100 may generate one or more meeting invites and transmit the meeting invites to respective ones of the recipients that are specified in input components 106 and 108.

The meeting segmentation input component 114 may include a button. When the meeting segmentation input component 114 is activated (e.g., pressed), a screen 200 (shown in FIG. 2) may be displayed. In some implementations, the screen 200 may be displayed concurrently with the screen 100. In other implementations, however, the screen 100 may be hidden and the screen 200 may be displayed in place of the screen 100. As used herein, the term "screen" may refer to a pane or another container for user interface components (e.g., input components, etc.). When rendered on a display device, a screen may occupy the entire display device or only a portion thereof. Although in the example of FIG. 1, the input components 102-114 include buttons and text fields, it will be understood that the present disclosure is not limited to any specific implementation of the input components 102-114. For example, any of the text fields in the screen 100 may be replaced with drop-down menus, radio button menus, etc. Similarly, any of the buttons in the screen 100 may be replaced with clickable text labels, entries in a ribbon bar of the screen 100 (not shown), checkboxes, or sliders, etc.

FIG. 2 is a diagram of an example of the screen 200, according to aspects of the disclosure. The screen 200 may be used to divide a meeting (or meeting invite) into segments. The meeting (or meeting invite) that is divided into segments may be at least in part specified by the screen 100. Any meeting that is specified with the screen 100 may be associated with a particular time window during which the meeting is desired to be conducted. Accordingly, the term "segment" of a meeting (or meeting invite) may refer to a time period that falls entirely within the time window of the meeting, but which has a shorter duration than the time window, The screen 200 may include portions 204A-C. Each of portions 204A-C may be arranged to specify a different segment of a meeting invite (or meeting) that is specified via the screen 100. Each of the portions 204A-C may include respective input components 212-216. The input component 212 of any of portions 204A-C may be used to specify one or more participants who are required to attend the segment that is specified by that portion. The input component 214 of any of portions 204A-C may be configured to specify the start time of the segment that is being specified with this portion. The input component 216 of any of portions 204A-C may be configured to specify the end time of the segment that is being specified with this portion.

The screen 200 may further include input components 202 and 203. Input component 202 may include a button. When the input component 202 is activated (e.g., pressed) an additional portion 204 may be added to the screen 200. The addition of one more portions 204 may enable the user to specify an additional segment of the meeting. Input component 203 may include a button. When the input component 203 is activated (e.g., pressed) one of the portions 204A-C may be removed from the screen 200. The deletion of any of the portions 204 from the screen 200 may enable the user to reduce the number of segments that have been allocated within the meeting.

The screen 200 may further include an input component 206. Input component 206 may include a button. When the input component 206 is activated (e.g., pressed), the screen 200 may be closed. After the screen 200 is closed, the user may activate (e.g., press) the input component 102 (shown in FIG. 1). When the input component 102 is activated, the invite processor 403 may generate one or more invites and transmit the invites to recipients that are specified via input components 106-108 of the screen 100 (shown in FIG. 1), and/or input components 212 of the portions 204A-C (shown in FIG. 2). In some implementations, the input processor 403 may transmit a primary invite, such as the primary invite 300 which is discussed further below with respect to FIG. 3A. Additionally or alternatively, in some implementations, the input processor may transmit one or more secondary invites, such as the secondary invites 332A-C, which are discussed further below with respect to FIG. 3B.

In some implementations, the screen 200 (and/or the invite processor 403) may be configured to implement one or more validation rules with respect to input that is received at any of input components 212-216. The validation rules may be based on input that is received at screen 100. For example, if the user attempts to enter, in input component 212, an identifier of a recipient that is not specified in the screen 100 (e.g., a recipient that is not specified in input component 106), the invite processor 403 may generate an error, and reject the input. Similarly, if the user attempts to enter in input component 214 a start time for a segment that is before the start time for the meeting (specified in input component 110), the invite processor 403 may generate an error, and reject the input. If the user attempts to enter in input component 216 an end time for a segment that is after the end time for the meeting (specified in input component 112), the invite processor 403 may generate an error, and reject the input.

Additionally or alternatively, in some implementations, the screen 200 may be generated based on input received in the screen 100. For example, in implementations in which the input component 212 is a drop-down menu, the drop-down menu may be populated with identifiers of recipients that are entered into the input component 106. In implementations in which the input component 214 is a drop-down menu, the drop-down menu may be populated with time identifiers that are spaced in 15-minute increments, starting from the time entered in input component 110 and ending 15 minutes before the time specified in input component 112. Similarly, in implementations in which the input component 216 is a drop-down menu, the drop-down menu may be populated with time identifiers that are spaced in 15-minute increments, starting 15 minutes after the time entered in input component 110 and ending 15 at the time specified in input component 112.

FIG. 3A is a diagram of a primary invite 300 that is generated by the invite processor 403 based on input received via the screens 100 and 200 (shown in FIGS. 1-2). According to the present example, the primary invite is associated with a meeting (hereinafter "associated meeting") and it is used to invite a group of recipients to the meeting. The term "recipient" as used throughout the disclosure, refers to a person or entity that is invited to attend a meeting.

A recipient may be identified (e.g., in fields 106, 108, or 212) by the recipient's email address or any other suitable identifier.

The primary invite 300 may include a portion 302 that includes: (i) the title of the associated meeting, a time window for the associated meeting, a list of recipients that are required to attend the associated meeting, and a list of recipients whose attendance is optional. As discussed above, the title may be specified via input component 104, the list of required recipients may be specified via input component 106, the list of optional recipients may be specified via input component 108, and the time window for the meeting may be specified via input components 110-112.

The primary invite 300 may further include a portion 304 that includes a plurality of segment definitions 312A-C. Each of the segment definitions 312A-C may correspond to a different segment for the associated meeting. Each of the segment definitions 312A-C may be specified by input received through the screen 200 (shown in FIG. 2). Specifically, segment definition 312A may be generated based on input received through portion 204A of the screen 200. As illustrated, segment definition 312A may include the title of a first segment of the associated meeting, a time window for the first segment, and a list of recipients that are required to attend the first segment. Segment definition 312B may be generated based on input received through portion 204B of the screen 200. As illustrated, segment definition 312B may include the title of a second segment of the associated meeting, a time window for the second segment, and a list of recipients that are required to attend the second segment. Segment definition 312C may be generated based on input received through portion 204C of the screen 200. As illustrated, segment definition 312C may include the title of a third segment of the associated meeting, a time window for the third segment, and a list of recipients that are required to attend the third segment.

As used throughout the disclosure, the term "segment definition" may refer to data that identifies at least a time window of a segment and one or more recipients who are invited to attend the segment. The information may or may not be consolidated in the same data structure (or block of memory). Although in the example of FIG. 3A segment definitions 312A-C are depicted as discrete blocks (or data structures), it will be understood that, in some implementations, the information that constitutes the segment definitions 312A-C may be contained in the same block (or data structure) or organized differently (e.g., dispersed across multiple data structures, etc.).

In one aspect, FIG. 3A illustrates that the list of recipients that are required to attend any of the segments in the associated meeting may include fewer than all recipients that are specified via the input component 106 for the entire associated meeting. However, it will be understood that the list of recipients that are invited (or required) to attend a particular segment may recipients that are specified via the input component 106. In another aspect, FIG. 3A illustrates that the list of recipients that are required to attend any of the segments in the associated meeting may include only recipients who are included in the list of recipients that are specified with the input component 106 for the entire meeting. In yet another aspect, FIG. 3A illustrates that the segments in a meeting may be head-to-head or they may be separated by a period of time, within the time window for the meeting, which has not been allocated to any particular segment. FIG. 3A is provided as an example, however, and the present disclosure is not limited by it. In general, the provision of the capability to specify segments within a meeting enables the person who is setting up the meeting to identify times within the meeting when any given one of the invitees is required to attend and times that can be skipped by an invitee if they are overly busy.

FIG. 3B shows an example of a plurality of secondary invites 332A-C. Each of the secondary invites 332A-C may be an object representing a particular segment within the meeting that is associated with the primary invite 300. According to the present example, the secondary invite 332A is generated based on the segment definition 312A; the secondary invite 332B is generated based on the segment definition 312B; and the secondary invite 332C is generated based on the segment definition 312C. According to the example of FIG. 3A, each of the secondary invites 332 includes an indication 322 of the title of the associated meeting (discussed with respect to FIG. 3A), an indication 324 of the title of the segment that is associated with the secondary invite, an indication 326 of the time window for the segment, and an indication 328 of the list of participants that are required to attend the segment. Generating a secondary invite based on a segment definition may include incorporating at least some of the information (e.g., any of the information) that is part of the segment definition into the secondary invite. Furthermore, generating a secondary invite based on a segment definition may optionally include incorporating into the secondary invite at least some of the information (e.g., any of the information) that is contained in a primary invite of which the segment definition is part. Although not shown in FIG. 3B, any of the secondary invites 332 may include an indication of the entire time window for the associated meeting, an indication of the list of required (or optional) participants who are invited to attend the meeting, and/or any other suitable type of information.

The terms "primary" and "secondary", as used in the phrases "primary invite" and "secondary invite", are not intended to imply any degree of precedence between the two types of invites. The terms "primary" and "secondary" are used to denote that, in one example, any of the secondary invites may be generated by parsing a primary invite. However, with that said, it will be understood that in other implementations, any of the secondary invites may be generated directly based on input received via screens 100-200, without the intermediate step of creating a primary invite beforehand.

Although in the example of FIG. 3A the primary invite 300 includes segment definitions, it will be understood that a primary invite may not necessarily include segment definitions. For example, when the user chooses not to divide a meeting into segments, the primary invite for the meeting would lack segment definitions. In general, each of the primary invites and secondary invites may include an object that can be parsed by scheduling software to create a calendar entry for the meeting and/or segment(s) that are associated with the invite. The scheduling software may be standalone software or a software module that is part of another application, such as an email client (e.g., Outlook™) or a teleconferencing application (e.g., Teams™). As is discussed further below, different segments in a meeting may be represented by different entries in a calendar that is being managed by the scheduling software.

Figure 3C:
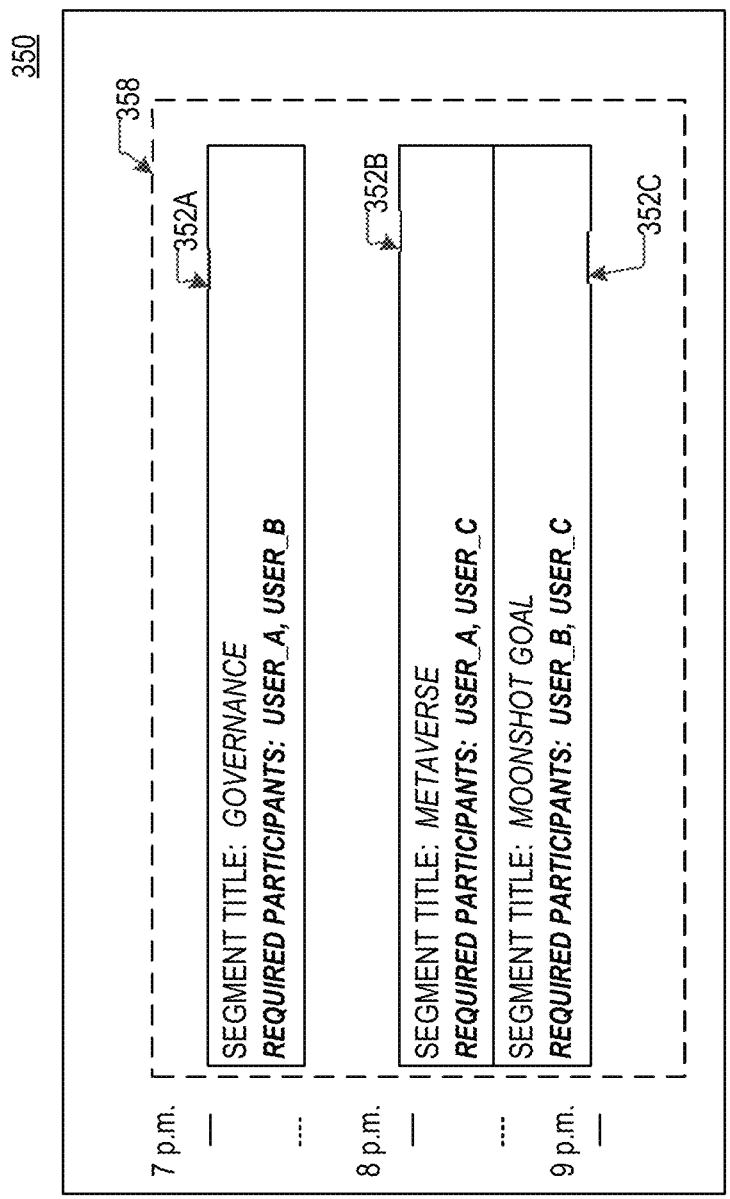
FIG. 3C is a diagram of an example of a plurality of calendar entries, according to aspects of the disclosure.

FIG. 3C is a diagram of an example of a calendar screen 350, according to aspects of the disclosure. The calendar screen 350 may include segment entries 352A-C. As used herein, the term "segment entry" refers to one or more visual elements that are displayed in a calendar (and/or their programmatic representation), which include an identifier corresponding to a meeting segment and denote the start and end times of the segment. Segment entry 352A corresponds to the first segment, which is discussed above with respect to FIG. 3A, and it may include any of the information that is contained in segment definition 312A. Segment entry 352B corresponds to the second segment, which is discussed above with respect to FIG. 3A, and it may include any of the information that is contained in segment definition 312B. Segment entry 352C corresponds to the third segment, which is discussed above with respect to FIG. 3A, and it may include any of the information that is contained in segment definition 312C. The calendar screen 350 may be configured to indicate that segment entries 352A-C are associated with segments that belong to the same meeting. According to the present example, this is achieved by surrounding the segment entries 352A-C with a dashed rectangle 358. However, the present disclosure is not limited thereto. For example, in some implementations, instead of using a dashed rectangle, the segment entries 352A-C may be colored in the same color to communicate that the segment entries 352A-C correspond to segments of the same meeting. Furthermore, alternative implementations are possible in which each of the segment entries 352A-C is configured to include an identifier corresponding to the meeting of which the segment of that entry is part. In this case, each of the segment entries 352A-C may include both: (i) an identifier (e.g., "a title") of a given segment that is associated with the segment entry, and (ii) an identifier (e.g., "a title") of the meeting of which the given segment is part.

In some implementations, the calendar screen 350 may be part of the user interface of the invite processor 403. Alternatively, in some implementations, the calendar screen 350 may be part of an application that is separate (and/or unrelated) to the invite processor 403. For instance, in some implementations, the invite processor 403 may be implemented as a plug-in for Outlook™. In such implementations, the calendar screen 350 may be part of the user interface of Outlook™.

Moreover, in some implementations, a device may not need to have the invite processor 403 installed to be able to display the segment entries 352A-C. As discussed above, in some implementations, the invite processor 403 may parse the primary invite 300 into a plurality of secondary invites, where each secondary invite corresponds to a different one of the segment definitions 312A-C, after which the invite processor 403 may send each of the generated secondary invites separately. In such implementations, any device that receives one of the secondary invites may treat it as an ordinary calendar invite and display it in a well-known fashion. By contrast, if a primary invite is sent to a device that lacks the invite processor 403, the device may be unable to process the primary invite and generate segment entries that correspond to different segment definitions that are part of the primary invite. On the other hand, if the device has the invite processor 403 installed, the device may be able to parse the primary invite and generate the segment entries directly from segment definitions that are contained in the primary invite. FIG. 3C is provided as an example only. In will be understood that the present disclosure is not limited to any specific method for displaying calendar entries that are generated based on user input received via the screens 100 and 200 (shown in FIGS. 1-2).

Figure 4:
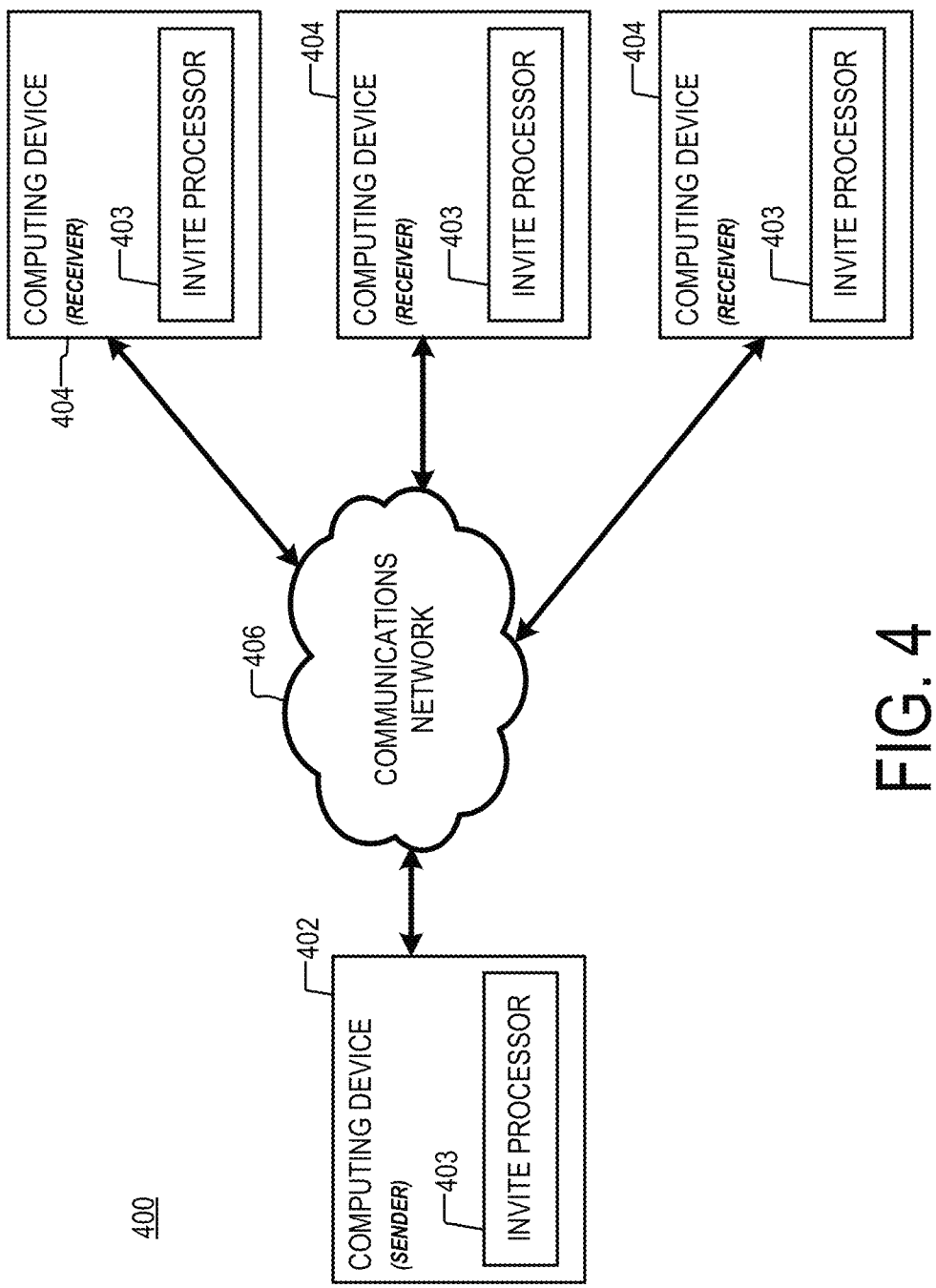
FIG. 4 is a diagram of an example of a system, according to aspects of the disclosure.

FIG. 4 is a diagram of an example of a system 400, according to aspects of the disclosure. As illustrated, the system 400 may include a computing device 402 and a plurality of computing devices 404 that are coupled to one another via a communications network 406. The communications network 406 may include a local area network (LAN), a wide area network (WAN), a wireless network (e.g., an 802.11, 5G, or Long-Term Evolution (LTE) network), and/or any other suitable type of communications network. Each of the computing devices 402 and 404 may be the same or similar to the computing device 800, which is discussed further below with respect to FIG. 8. Each of the computing devices 402-404 may be configured to execute an instance of the invite processor 403. According to the present example, the computing device 402 is used by a person who is scheduling a meeting, and computing devices 404 are associated with respective persons who are invited to attend the meeting.

Figure 5:
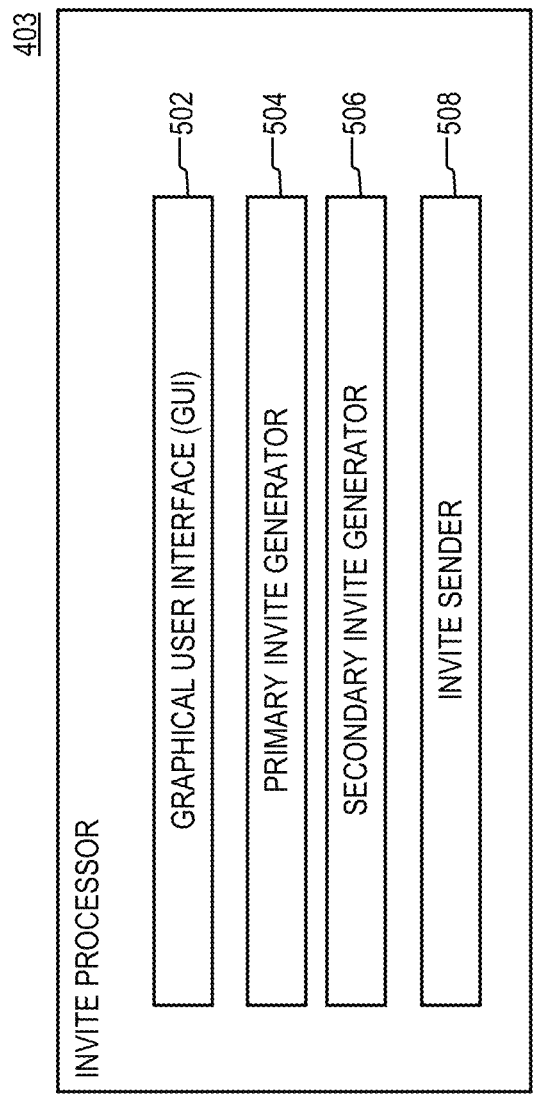
FIG. 5 is a diagram of an example of an invite processor, according to aspects of the disclosure.

FIG. 5 is a diagram illustrating one possible implementation of the invite processor 403. As illustrated, the invite processor 403 may include a user interface 502, a primary invite generator 504, a secondary invite generator 506, and an invite sender 508. The interface 502 may include the screens 100-200, which are discussed above with respect to FIGS. 1-2. The primary invite generator 504 may be configured to generate a primary invite based on user input that is received through the interface 502. The generated primary invite may be the same or similar to the primary invite 300, which is discussed above with respect to FIG. 3A. The secondary invite generator 506 may be configured to parse a primary invite into a plurality of secondary invites. Each of the secondary invites may be the same or similar to the secondary invites 332A-C, which are discussed above with respect to FIG. 3B. The invite sender 508 may be configured to send any primary invites (generated by the generator 504) and/or any of the secondary invites (generated by the generator 506) to the respective recipients of these invites. According to the present example, each of the interface 502, the generator 504, the generator 506, and the invite sender 508 is implemented in software. However, alternative implementations are possible in which any of the interface 502, the generator 504, the generator 506, and the invite sender 508 is implemented in hardware and/or as a combination of software and hardware.

Figure 6:
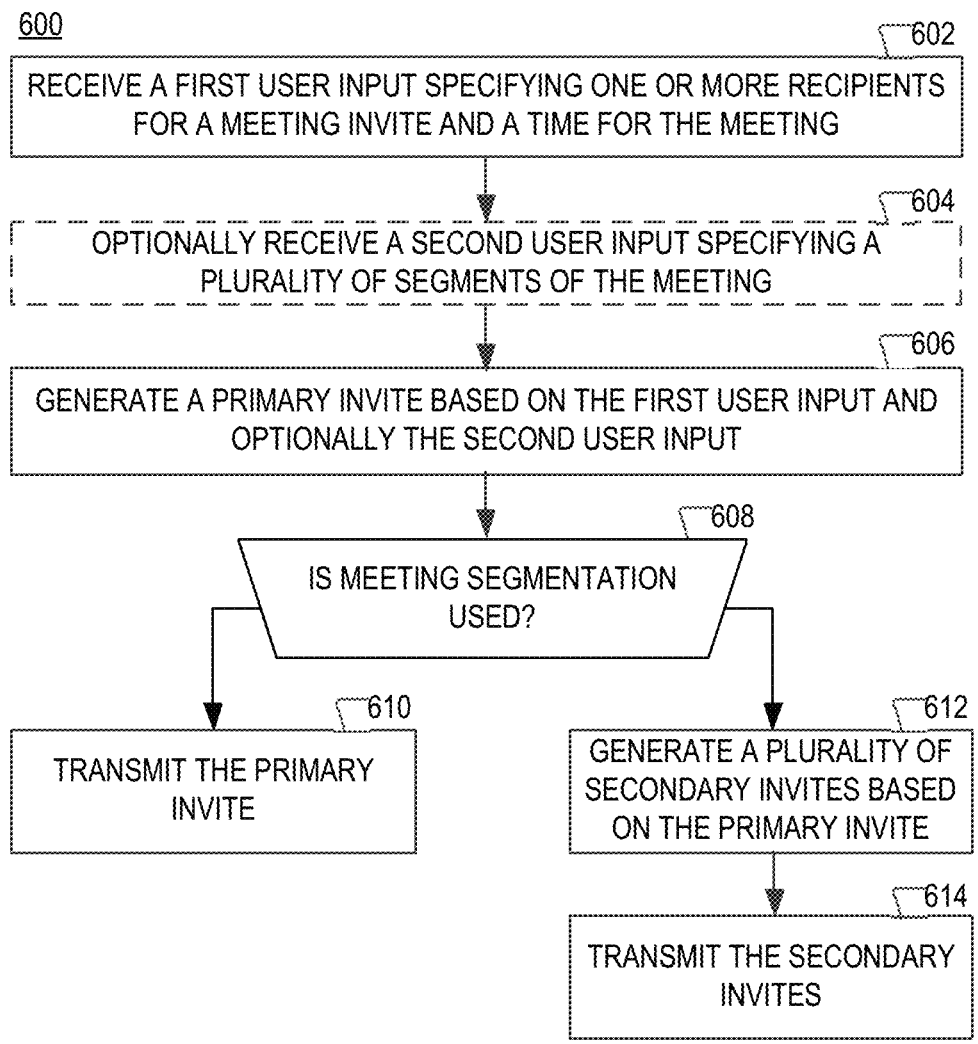
FIG. 6 is a flowchart of an example of a process, according to aspects of the disclosure.

FIG. 6 is a diagram of an example of a process 600, according to aspects of the disclosure.

At step 602, the invite processor 403 receives a first user input specifying one or more recipients for a meeting invite and a time for the meeting. The first user input may be received through the screen 100 (shown in FIG. 1). The first user input may include a title for the meeting that is entered by using input component 104, a list of required recipients that is entered by using the input component 106, a list of optional recipients that is entered by using the input component 108, and a start and end times of the meeting that are entered by using input components 110 and 112.

At step 604, the invite processor 403 receives a second user input specifying a plurality of segments for the meeting. The second user input may be received through the screen 200 (shown in FIG. 2). The second user input may include a list of recipients for a first segment, as well as a start and end times of the first segment. The list of recipients for the first segment may be entered by using input component 212 of portion 204A of the screen 200. The start and end times of the first segment may be entered by using input components 214-216 of portion 204A of the screen 200. The second user input may further include a list of recipients for a second segment, as well as a start and end times of the second segment. The list of recipients for the second segment may be entered by using input component 212 of portion 204B of the screen 200. The start and end times of the second segment may be entered by using input components 214-216 of portion 204B of the screen 200. The second user input may further include a list of recipients for a third segment, as well as a start and end times of the third segment. The list of recipients for the third segment may be entered by using input component 212 of portion 204C of the screen 200. The start and end times of the third segment may be entered by using input components 214-216 of portion 204C of the screen 200. According to the present example, step 604 is optional.

At step 606, the invite processor 403 generates a primary invite based on the first user input and the second user input (if the second user input is provided). The primary invite may be the same or similar to the primary invite 300, which is discussed above with respect to FIG. 3A.

At step 608, the invite processor 403, detects whether the meeting is divided into segments. According to the present example, the invite processor 403 may determine that the meeting is divided into segments if the primary invite (generated at step 606) includes one or more segment definitions. On the other hand, if the meeting invite lacks segment definitions, the invite processor 403 may determine that the meeting is not divided into segments. If the meeting is divided into segments, the process 600 proceeds to step 610. Otherwise, the process 600 proceeds to step 612.

At step 610, the invite processor 403 transmits the primary invite to the recipients that are associated with the primary invite (e.g., the recipients that are specified in input components 106 and 108 of the screen 100).

At step 612, the invite processor 403, generates a plurality of secondary invites based on the primary invite. The generated secondary invites may be the same or similar to the secondary invites 332A-C that are discussed above with respect to FIG. 3B. Specifically, for each segment definition in the primary invite, the invite processor 403 may generate a different respective secondary invite. Each of the secondary invites may be generated in the manner discussed above with respect to FIG. 3B.

At step 614, the invite processor 403 transmits each of the secondary invites to the recipients that are associated with the secondary invite (i.e., the recipients specified by input component 212 of the portion 204 that is used to generate the secondary invite).

The process 600 is presented as an example only. As noted above, in some implementations, the invite processor 403 may transmit the primary invite (generated at step 606) irrespective of whether meeting segmentation is used. In such implementations, the primary invite may be transmitted together with any secondary invites that are generated based on the primary invite. Furthermore, in some implementations, when meeting segmentation is used, the invite processor 403 may abstain from generating a primary invite, and generate secondary invites only. And still furthermore, in some implementations, the invite processor may generate and send only the primary invite, without generating any secondary invites. In addition, in some implementations, both a primary invite and secondary invites for the same meeting may be transmitted.

Figure 7:
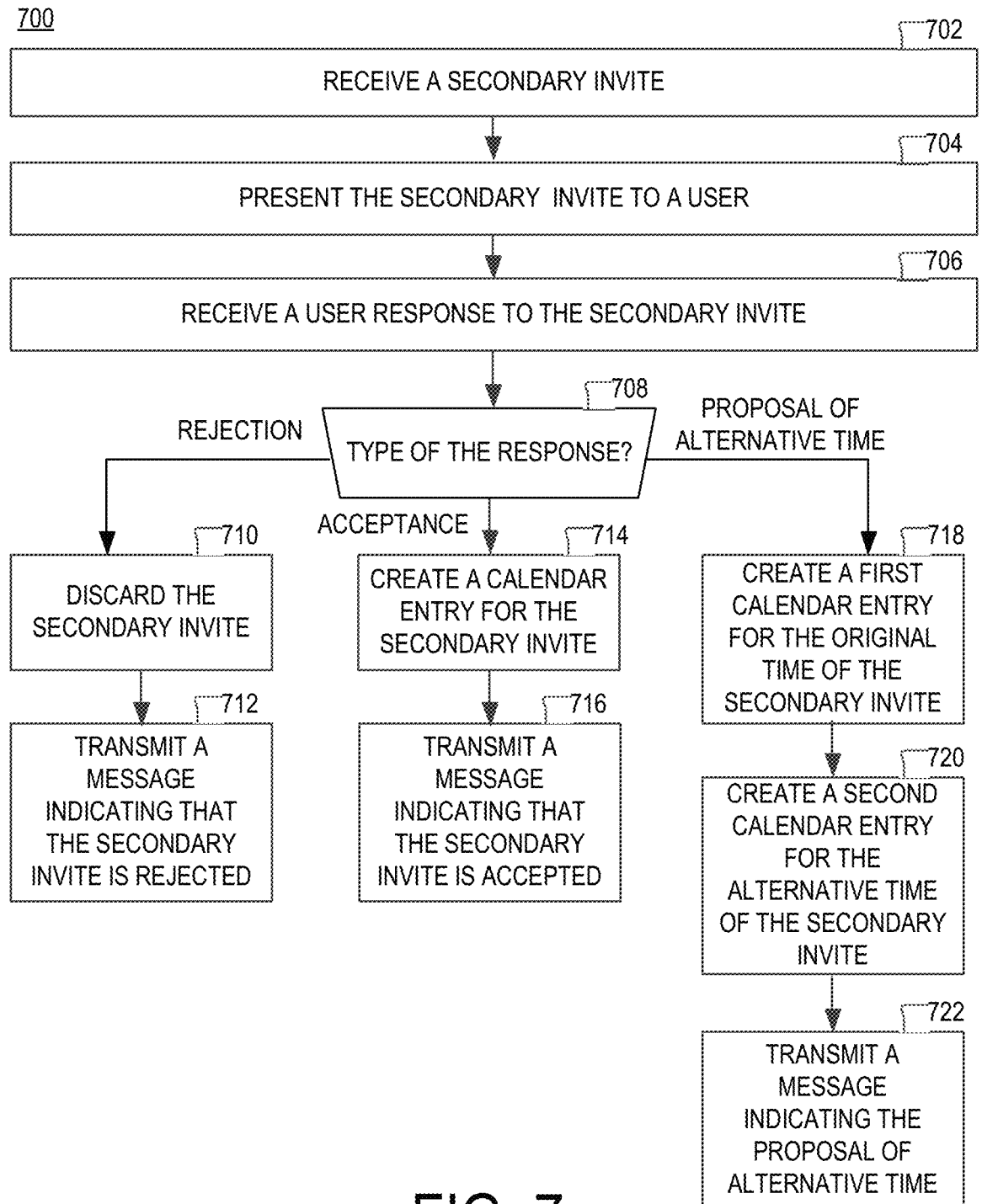
FIG. 7 is a flowchart of an example of a process, according to aspects of the disclosure.

FIG. 7 is a flowchart of an example of a process 700, according to aspects of the disclosure. According to the present example, the process 700 is performed by a receiver device. The receiver device may be the same or similar to any of the devices 404 (shown in FIG. 4). However, it will be understood that the present disclosure is not limited to any specific entity performing the process 700.

At step 702, a secondary invite is received at the receiver device. The secondary invite may be the same or similar to any of the secondary invites transmitted at step 614 (shown in FIG. 6). The secondary invite may be received from a sender device. The sender device may be the same or similar to the computing device 402, which is discussed above with respect to FIG. 4.

At step 704, the secondary invite is presented to the user. Presenting the secondary invite to the user may include displaying, on a display device, an indication of the secondary invite. The display device may be part of the receiver device that is executing the process 700.

At step 706, a user response to the invite is received at the receiver device. The user response may be received through an input device of the receiver device, such as a keyboard, mouse, touchscreen, or microphone. The response may be one of: (i) a response accepting the invite, (ii) a response rejecting the invite, or (iii) a response proposing an alternative time.

At step 708, the receiver device determines the type of the response (received at step 706). If the response is a rejection, the process 700 proceeds to step 710. If the response is an acceptance, the process 700 proceeds to step 714. If the response is a proposal of an alternative time, the process 700 proceeds to step 718.

At step 710, the receiver device discards the secondary invite (received at step 702). At step 712, the receiver device transmits, to the sender device, a message indicating that the secondary invite has been rejected.

At step 714, the receiver device creates a calendar entry for the secondary invite. The calendar entry may reserve a time slot that is identified in the secondary invite. As noted above, the time slot may correspond to a particular meeting segment that is associated with the secondary invite. The calendar entry may be the same or similar to any of the segment entries 352A-C, which are discussed above with respect to FIG. 3C. At step 716, the receiver device transmits a message indicating that the secondary invite has been accepted.

At step 718, the receiver device creates a first calendar entry for the secondary invite. The first calendar entry may reserve a time slot that is identified in the secondary invite. As noted above, the time slot may correspond to a particular meeting segment that is associated with the secondary invite. The first calendar entry may be the same or similar to any of the segment entries 352A-C, which are discussed above with respect to FIG. 3C. At step 720, the receiver device creates a second calendar entry that reserves an alternative time slot for the segment (proposed at step 706). The second calendar entry may be the same or similar to any of the segment entries 352A-C, which are discussed above with respect to FIG. 3C. At step 722, the receiver device transmits, to the sender device, a message indicating the alternative time. After the message is transmitted, the sender device may return a response to the sender device, indicating whether the alternative time is accepted. If the alternative time is accepted, the receiver device may delete the first calendar entry (created at step 718) and leave only the second calendar entry (created at step 720). Otherwise, if the alternative time is rejected, the receiver device may delete the second calendar entry (created at step 720) and leave only the first calendar entry (created at step 718).

FIG. 7 is provided as an example only. In the example of FIG. 7, the calendar entries (generated at steps 714 and 718) are produced by processing a secondary invite that is received at the receiver device. However, alternative implementations are possible in which the calendar entries are generated by processing a segment definition contained in a primary invite that is received at the receiver device.

Figure 8:
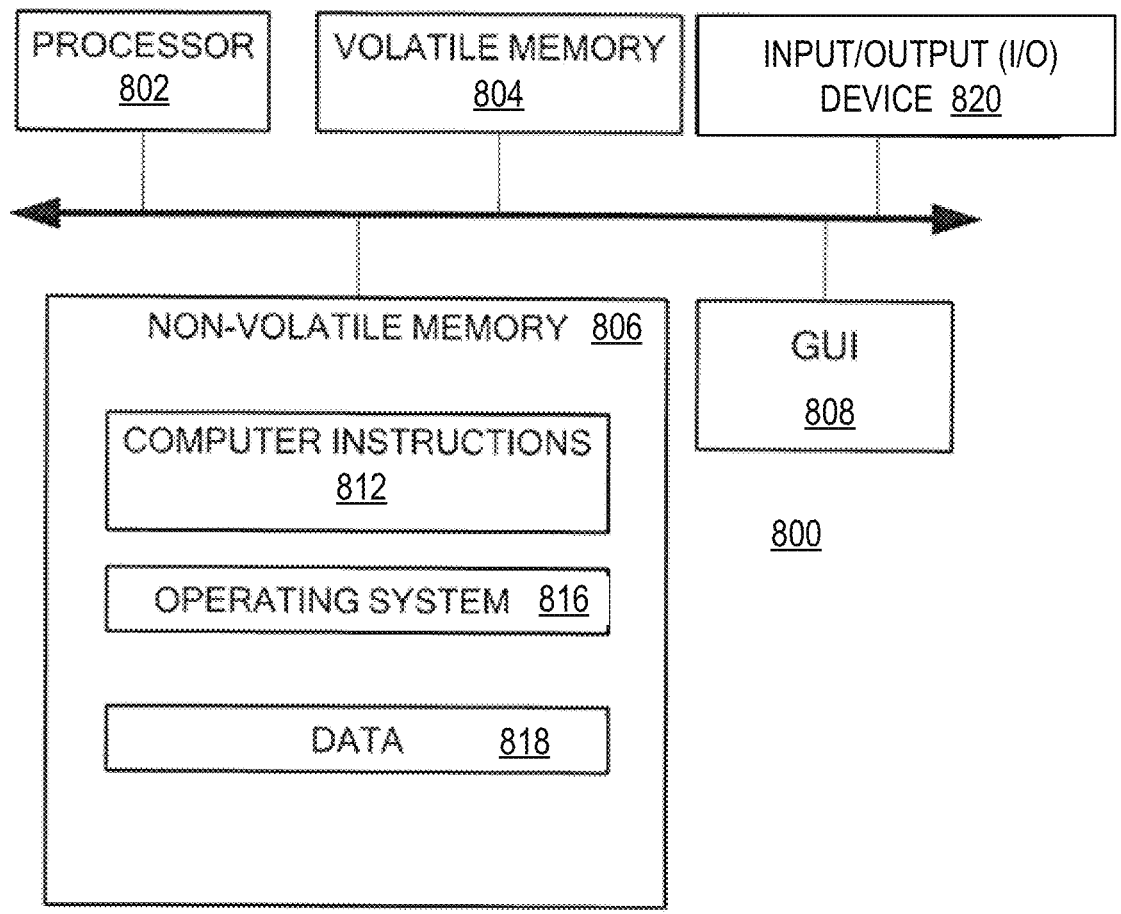
FIG. 8 is a diagram of an example of a computing device, according to aspects of the disclosure.

Referring to FIG. 8, computing device 800 may include processor 802, volatile memory 804 (e.g., RAM), non-volatile memory 806 (e.g., a hard disk drive, a solid-state drive such as a flash drive, a hybrid magnetic and solid-state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804. Program code may be applied to data entered using an input device of GUI 808 or received from 110 device 820.

Processor 802 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

As used throughout the disclosure, the term "subset" as used in the phrase "a second set of recipients that is a subset of the first set" shall include the empty set. The term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the. standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
    displaying a first user interface screen and receiving, at the first user interface screen, a first user input specifying: (i) a start time and an end time for a meeting, and (ii) a list of invitees to the meeting;
    detecting that an input component that is part of the first user interface screen is activated;
    in response to the input component being activated, displaying a second user interface screen that is generated at least in part based on the first user input, the second user interface screen including: (i) a first segment recipient menu, the first segment recipient menu being populated with the list of invitees that is specified in the first user interface screen, (ii) a first start time selection menu that is populated with a plurality of start time identifiers, the plurality of start time identifiers identifying a plurality of possible start times that are spaced apart from each other by a predetermined increment value, such that an earliest one of the plurality of possible start times is equal to the start time that is specified by the first user input and a latest one of the possible start times is equal to the end time that is specified by the first user input minus the predetermined increment value, and (iii) a first end time selection menu that is populated with a plurality of end time identifiers, the plurality of end time identifiers identifying a plurality of possible end times that are spaced apart from each other by a predetermined increment value, such that an earliest one of the plurality of possible end times is equal to the start time that is specified by the first user input plus the predetermined increment value and a latest one of the possible end times is equal to the end time that is specified by the first user input;
    receiving a second user input at the second user interface screen, the second user input specifying a plurality of segments of the meeting, a respective set of one or more invitees for each of the plurality of segments, a respective start time for each of the plurality of segments, and a respective end time for each of the plurality of segments, wherein the respective set of invitees for a given one of the plurality of segments is specified by using the first segment recipient menu, the respective start time for the given segment is specified by using the first start time selection menu, and the respective end time for the given segment is specified by using the first end time selection menu; and
    generating a different respective segment invite for each of the plurality of segments and transmitting the segment invite to the respective set of invitees for the segment.

2. The method of claim 1, wherein each of the generated segment invites includes a respective identifier of the meeting and a respective identifier of the segment invite's respective segment.

3. The method of claim 1, further comprising generating, by a primary invite generator, a primary invite based on the first user input and the second user input, the primary invite including a plurality of segment definitions, each of the plurality of segment definitions representing a different one of the plurality of segments, wherein the segment invites are generated, by a secondary invite generator, by parsing the primary invite, each of the segment invites being generated based on a different one of the plurality of segment definitions.

4. The method of claim 1, wherein the input component that is part of the first user interface screen includes a meeting segmentation button.

5. The method of claim 1, wherein the first segment recipient menu includes a drop-down menu, the first start time selection menu includes a drop-down menu, and the first end time selection menu includes a drop-down menu.

6. The method of claim 1, wherein:
    the second user interface screen includes, an add-section input component, a delete-section input component, a first section and a second section,
    the first segment recipient menu, the first start time selection menu, and the first end time selection menu are part of the first section,
    the second section includes a second segment recipient menu that is populated with the list of invitees that is specified in the first user interface screen, a second start time selection menu, and a second end time selection menu,
    the add-section input component when activated, causes: (i) a number of segments in the meeting to be increased, and (ii) an additional section to be added to the second user interface screen, the additional section including a respective segment recipient menu, a respective start time selection menu, and a respective end time selection menu, and
    the delete-section input component, when activated, causes: (i) the number of segments in the meeting to be reduced, and (ii) a removal, from the second user interface screen, of a section that is currently being displayed in the second interface screen.

7. A system, comprising:
    a memory; and
    at least one hardware processor that is configured to perform the operations of:
    displaying a first user interface screen and receiving, at the first user interface screen, a first user input specifying: (i) a start time and an end time for a meeting, and (ii) a list of invitees to the meeting;
    detecting that an input component that is part of the first user interface screen is activated;
    in response to the input component being activated, displaying a second user interface screen that is generated at least in part based on the first user input, the second user interface screen including: (i) a first segment recipient menu, the first segment recipient menu being populated with the list of invitees that is specified in the first user interface screen, (ii) a first start time selection menu that is populated with a plurality of start time identifiers, the plurality of start time identifiers identifying a plurality of possible start times that are spaced apart from each other by a predetermined increment value, such that an earliest one of the plurality of possible start times is equal to the start time that is specified by the first user input and a latest one of the possible start times is equal to the end time that is specified by the first user input minus the predetermined increment value, and (iii) a first end time selection menu that is populated with a plurality of end time identifiers, the plurality of end time identifiers identifying a plurality of possible end times that are spaced apart from each other by a predetermined increment value, such that an earliest one of the plurality of possible end times is equal to the start time that is specified by the first user input plus the predetermined increment value and a latest one of the possible end times is equal to the end time that is specified by the first user input;

receiving a second user input at the second user interface screen, the second user input specifying a plurality of segments of the meeting, a respective set of one or more invitees for each of the plurality of segments, a respective start time for each of the plurality of segments, and a respective end time for each of the plurality of segments, wherein the respective set of invitees for a given one of the plurality of segments is specified by using the first segment recipient menu, the respective start time for the given segment is specified by using the first start time selection menu, and the respective end time for the given segment is specified by using the first end time selection menu; and generating a different respective segment invite for each of the plurality of segments and transmitting the segment invite to the respective set of invitees for the segment.

8. The system of claim 7, wherein each of the generated segment invites includes a respective identifier of the meeting and a respective identifier of the segment invite's respective segment.

9. The system of claim 7, wherein:
the at least one processor is further configured to perform the operation of generating, by a primary invite generator, a primary invite based on the first user input and the second user input, the primary invite including a plurality of segment definitions, each of the plurality of segment definitions representing a different one of the plurality of segments, and
the segment invites are generated, by a secondary invite generator, by parsing the primary invite, each of the segment invites being generated based on a different one of the plurality of segment definitions.

10. The system of claim 7, wherein the input component that is part of the first user interface screen includes a meeting segmentation button.

11. The system of claim 7, wherein segment recipient menu includes a drop-down menu, the first start time selection menu includes a drop-down menu, and the first end-time selection menu includes a drop-down menu.

12. The system of claim 7, wherein:
the second user interface screen includes an add-section input component, a delete-section input component, a first section, and a second section,
the first segment recipient menu, the first start time selection menu, and the first end time selection menu are part of the first section,
the second section includes a second segment recipient menu that is populated with the list of invitees that is specified in the first user interface screen, a second start time selection menu, and a second end time selection menu the add-section input component, when activated, causes: (i) a number of segments in the meeting to be increased, and (ii) an additional section to be added to the second user interface screen, the additional section including a respective segment recipient menu, a respective start time selection menu, and a respective end time selection menu, and the delete-section input component when activated causes: (i) the number of segments in the meeting to be reduced, and (ii) a removal, from the second user interface screen, of a section that is currently being displayed in the second interface screen.

13. A non-transitory computer-readable medium storing one or more processor-executable instructions, which, when executed by at least one processor, cause the at least one processor to perform the operations of:

displaying a first user interface screen and receiving, at the first user interface screen, a first user input specifying: (i) a start time and an end time for a meeting, and (ii) a list of invitees to the meeting;

detecting that an input component that is part of the first user interface screen is activated;

in response to the input component being activated, displaying a second user interface screen that is generated at least in part based on the first user input, the second user interface screen including: (i) a first segment recipient menu, the first segment recipient menu being populated with the list of invitees that is specified in the first user interface screen, (ii) a first start time selection menu that is populated with a plurality of start time identifiers, the plurality of start time identifiers identifying a plurality of possible start times that are spaced apart from each other by a predetermined increment value, such that an earliest one of the plurality of possible start times is equal to the start time that is specified by the first user input and a latest one of the possible start times is equal to the end time that is specified by the first user input minus the predetermined increment value, and (iii) a first end time selection menu that is populated with a plurality of end time identifiers, the plurality of end time identifiers identifying a plurality of possible end times that are spaced apart from each other by a predetermined increment value, such that an earliest one of the plurality of possible end times is equal to the start time that is specified by the first user input plus the predetermined increment value and a latest one of the possible end times is equal to the end time that is specified by the first user input;

receiving a second user input at the second user interface screen, the second user input specifying a plurality of segments of the meeting, a respective set of one or more invitees for each of the plurality of segments, a respective start time for each of the plurality of segments, and a respective end time for each of the plurality of segments, wherein the respective set of invitees for a given one of the plurality of segments is specified by using the first segment recipient menu, the respective start time for the given segment is specified by using the first start time selection menu, and the respective end time for the given segment is specified by using the first end time selection menu; and generating a different respective segment invite for each of the plurality of segments and transmitting the segment invite to the respective set of invitees for the segment.

14. The non-transitory computer-readable medium of claim 13, wherein each of the generated segment invites includes a respective identifier of the meeting and a respective identifier of the segment invite's respective segment.

15. The non-transitory computer-readable medium of claim 13, wherein:
the one or more processor-executable instructions, when executed by the at least one processor, further cause the at least one processor to perform the operation of generating, by a primary invite generator, a primary invite based on the first user input and the second user input, the primary invite including a plurality of segment definitions, each of the plurality of segment definitions representing a different one of the plurality of segments, and
the segment invites are generated, by a secondary invite generator, by parsing the primary invite, each of the segment invites being generated based on a different one of the plurality of segment definitions.

16. The non-transitory computer-readable medium of claim 13, wherein the input component that is part of the first user interface screen includes a meeting segmentation button.

17. The non-transitory computer readable storage medium of claim 15, wherein:
the second user interface screen includes an add-section input component, a delete-section input component, a first section, and a second section,
the first segment recipient menu, the first start time selection menu, and the first end time selection menu are part of the first section,
the second section includes a second segment recipient menu that is populated with the list of invitees that is specified the first user interface screen, a second start time selection menu, and a second end time selection menu,
the add-section input component, when activated, causes: (i) a number of segments in the meeting to be increased, and (ii) an additional section to be added to the second user interface screen, the additional section including a respective segment recipient menu, a respective start time selection menu, and a respective end time selection menu, and
the delete-section input component, when activated, causes: (i) the number of segments in the meeting to be reduced, and (ii) a removal, from the second user interface screen, of a section that is currently being displayed in the second interface screen.

* * * * *